(12) United States Patent
Xu et al.

(10) Patent No.: US 11,959,829 B2
(45) Date of Patent: Apr. 16, 2024

(54) STARTUP STAGE PROTECTION DEVICE FOR EXPERIMENT OF EMU TRAIN COUPLER

(71) Applicant: CENTRAL SOUTH UNIVERSITY, Hunan (CN)

(72) Inventors: Ping Xu, Changsha (CN); Shuguang Yao, Changsha (CN); Bowen Tan, Changsha (CN); Yong Peng, Changsha (CN); Zhaijun Lu, Changsha (CN); Chengming Sun, Changsha (CN); Kai Xu, Changsha (CN); Qi Huang, Changsha (CN)

(73) Assignee: CENTRAL SOUTH UNIVERSITY, Hunan (CN)

( * ) Notice: Subject to any disclaimer, the term of this patent is extended or adjusted under 35 U.S.C. 154(b) by 908 days.

(21) Appl. No.: 16/975,116

(22) PCT Filed: May 30, 2019

(86) PCT No.: PCT/CN2019/089167
§ 371 (c)(1),
(2) Date: Aug. 22, 2020

(87) PCT Pub. No.: WO2019/233333
PCT Pub. Date: Dec. 12, 2019

(65) Prior Publication Data
US 2021/0094593 A1    Apr. 1, 2021

(30) Foreign Application Priority Data
Jun. 4, 2018 (CN) .......................... 201810564238.5

(51) Int. Cl.
*G01M 17/08* (2006.01)
*B61G 5/10* (2006.01)
*G01M 7/08* (2006.01)

(52) U.S. Cl.
CPC .............. *G01M 17/08* (2013.01); *B61G 5/10* (2013.01); *G01M 7/08* (2013.01)

(58) Field of Classification Search
CPC ... B61G 5/00; B61G 5/02; B61G 5/06; B61G 5/10; G01M 7/08; G01M 17/08
See application file for complete search history.

(56) References Cited

U.S. PATENT DOCUMENTS

| 3,602,258 | A | * | 8/1971 | Gnavi | ...................... | B61G 5/06 |
| | | | | | | 285/123.17 |
| 8,230,730 | B2 | * | 7/2012 | Ma | ........................ | G01M 17/08 |
| | | | | | | 73/116.01 |
| 8,540,093 | B2 | * | 9/2013 | Paral | ........................ | B61G 5/02 |
| | | | | | | 213/1.3 |

FOREIGN PATENT DOCUMENTS

| CN | 1394778 | A | * | 2/2003 |
| CN | 1394778 | A | | 2/2003 |

(Continued)

OTHER PUBLICATIONS

International Search Report in the international application No. PCT/CN2019/089167, dated Aug. 23, 2019.

*Primary Examiner* — Zachary L Kuhfuss
*Assistant Examiner* — Cheng Lin
(74) *Attorney, Agent, or Firm* — Syncoda LLC; Feng Ma

(57) ABSTRACT

A startup stage protection device used in Electric Multiple Unit (EMU) train coupler experiment is provided between two test cars. The startup stage protection device is arranged between and tightly abuts two test cars at the starting stage of the experiment to receive a compressing force in place of the coupler. The startup stage protection device separates from the two test cars after the end of the starting stage.

10 Claims, 6 Drawing Sheets

(56) References Cited

FOREIGN PATENT DOCUMENTS

| | | | | |
|---|---|---|---|---|
| CN | 201004014 | Y | | 1/2008 |
| CN | 104008696 | A | * | 8/2014 |
| CN | 104008696 | A | | 8/2014 |
| CN | 206787830 | U | * | 12/2017 |
| CN | 206787830 | U | | 12/2017 |
| CN | 109000941 | A | | 12/2018 |
| EP | 0154283 | A1 | * | 9/1985 |
| JP | H06185970 | A | * | 7/1994 |
| JP | H06185970 | A | | 7/1994 |

* cited by examiner

US 11,959,829 B2

STARTUP STAGE PROTECTION DEVICE FOR EXPERIMENT OF EMU TRAIN COUPLER

CROSS-REFERENCE TO RELATED APPLICATIONS

This application is a U.S. national stage of International Patent Application No. PCT/CN2019/089167 filed on May 30, 2019, which claims priority to Chinese Patent Application No. 201810564238.5 filed on Jun. 4, 2018. The disclosures of these applications are hereby incorporated by reference in their entireties.

TECHNICAL FIELD

The present disclosure relates to a protection component of a connector for a rail vehicle, in particular to a startup stage protection device for an experiment of a coupler of Electric Multiple Unit (EMU) train. The present disclosure belongs to the field of the safety of trains.

BACKGROUND

The couplers of a train are a vehicle component configured to realize the coupling between head cars or intermediate cars, to transmit traction force and impact force, and to maintain a certain distance between the cars. As the running speed of trains increases, the couplers that play the role of connecting the various cars should be constantly experimented and improved.

Most of the existed experiments for the couplers are static pressure tests. For the EMU trains, the deformation sequence caused by an accident is one of the factors that need to be considered when design a coupler. However, the existing conventional static pressure tests cannot verify whether the coupler of EMU train meets the design requirements. Therefore, it is necessary to simulate the deformation sequence of the coupler during the car collision of EMU train, so as to determine whether the coupler of the EMU train functions in accordance with the design.

During the experiment of the car collision of the EMU train, the experimental device must reach the test speed required by the EN 15227 standard. The two test cars of the experimental device need to experience the latter one pushing the former one to make both of them reach the startup stage of running synchronously at the same speed. During the startup stage, due to large acceleration, the pressing force applied to the coupler is greatly beyond the normal range. At this time, the expansion tube in the coupler will be compressed, so that the subsequent complete collision experiment of coupler cannot be carried out, which greatly hinders the performance measurement of the coupler and deviates the experimental results from the facts.

SUMMARY

The technical problem to be solved by the present disclosure is to overcome the deficiencies and defects mentioned in the background, and to provide a startup stage protection device for an experiment of the coupler of EMU train. The startup stage protection device has a simple structure and does not affect the test process and can undergo a pressing force in place of the coupler during the startup stage.

In order to solve the above technical problem, the technical solutions proposed by the present disclosure are provided as follows.

A startup stage protection device for an experiment of the coupler of EMU train is provided between two test cars used in the experiment. The startup stage protection device is pressed between the two test cars during the startup stage of an experimental device to undergo a pressing force in place of the coupler. The startup stage protection device is detached from the two test cars after the startup stage.

As a further improvement of the above technical solution:

The startup stage protection device includes a support member, a first mounting base installed on one car and a second mounting base installed on another car. The first end of the support member is hinged to the second mounting base, and the second end of the support member is pressed against the car or the first mounting base during the startup stage of the experimental device and detached from the first mounting base after the startup stage is completed.

The first mounting base includes a detachment driving member, and a drive end of the detachment driving member is configured to push the support member to leave the pressed state.

The support member includes a strut and a stopper connected to the strut and arranged below the strut. An end of the strut rest on an upper surface of the car, and the stopper is pressured against on an end surface of the car.

The detachment driving member further includes a connecting rod, a positioning member and a telescopic driver. The positioning member is disposed on one side of the strut and the telescopic driver is disposed on another side of the strut. The first end of the connecting rod is connected to the positioning member, and the second end of the connecting rod is connected to the telescopic driver. The connecting rod is disposed below the strut or in the strut.

The first mounting base further includes a limitation frame fixedly connected to the upper surface of the car. The limitation frame is disposed on the end of the strut and restricts a lateral movement of the end of the strut.

Threaded holes are provided below the end of the strut and evenly spaced with each other at an interval along the axial direction of the strut. The stopper is provided with a plurality of the through holes at the same interval as the threaded holes. The stopper is fixed onto the strut by bolts passing through the through holes and fastened to the threaded holes.

A slide slot is provided below the second end of the support member along the axial direction of the support member. The drive end of the detachment driving member is provided with a slider configured to slide into the slide slot, and is slidably engaged with the second end of the support member by a sliding of the slider in the slide slot.

The second mounting base includes a mounting plate, and the first end of the support member is hinged to a surface of the mounting plate.

Compared with the prior art, the beneficial effects of the present disclosure are as follows.

The startup stage protection device for the experiment of the coupler of the EMU train according to the present disclosure is pressed between two test cars during the startup stage of the experimental device to undergo the pressing force in place of the coupler. The startup stage protection device is detached from the two test cars after the startup stage is completed. When the experimental device of the EMU train coupler is in the driving state, the startup stage protection device undergoes the pressing force in place of the coupler, so as to prevent a generation of a strong pressing force, which compresses the expansion tube of the coupler, during the startup stage. Therefore, the subsequent collision experiment of the coupler can be carried out completely without hindering the performance measurement of the coupler. The startup stage protection device realizes the connection between the two test cars, thus improving the transmission effect and accelerating the process of the two test cars running at the same speed. Therefore, the experimental device for the coupler of the EMU train enters the experimental state faster, which improves the experimental efficiency. When the experimental device for the coupler of the EMU train reaches the experimental state, the startup stage protection device is detached from the two test cars, so that the coupler enters the experimental state, thus the collision experiment of the coupler can be carried out as usual. This detachable startup stage protection device improves the accuracy and reliability of the collision experiment of the coupler, facilitates the experimental process and saves a lot of time.

BRIEF DESCRIPTION OF THE DRAWINGS

In order to explain the embodiments of the present disclosure or the technical solutions in the prior art more clearly, the drawings required to describe the embodiments or the prior art are briefly introduced below. It is apparent that the drawings in the following description are some of embodiments of the present disclosure, and other drawings may be obtained based on these drawings without paying any creative work for those of ordinary skill in the art.

Figure 1:
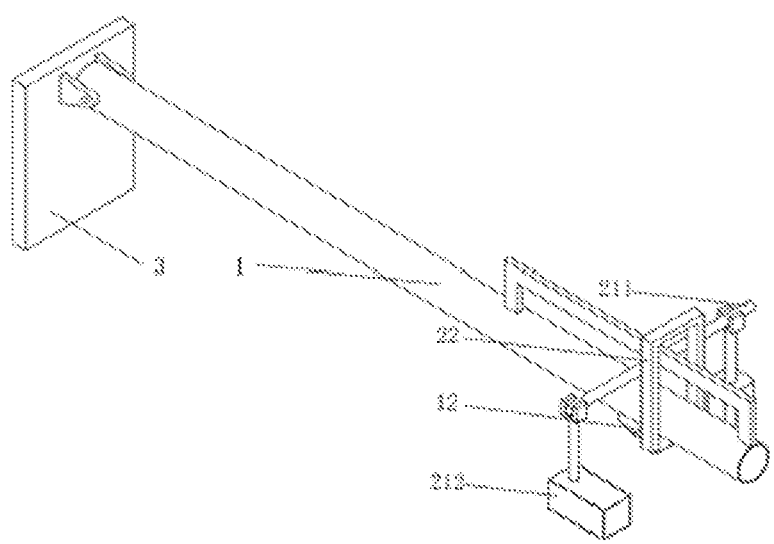
FIG. 1 is a schematic three-dimensional view of a startup stage protection device for an experiment of the coupler of EMU train in embodiment 1.
Figure 2:
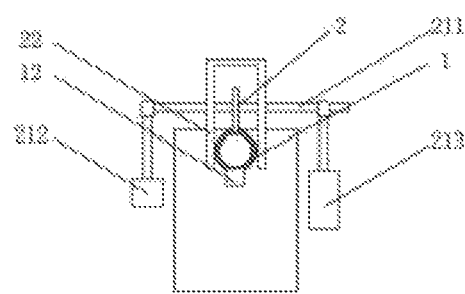
FIG. 2 is a schematic front view of the startup stage protection device for the experiment of the coupler of the EMU train in embodiment 1.
Figure 3:
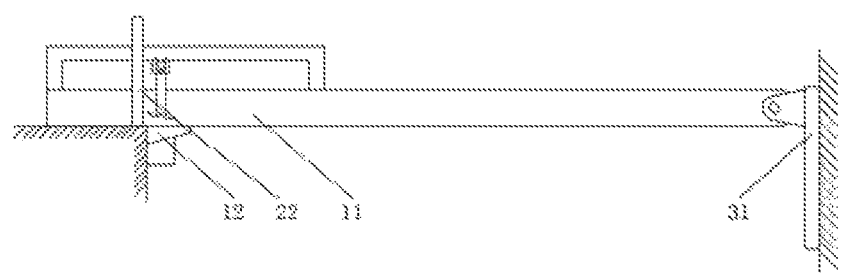
FIG. 3 is a schematic view of a support member in a pressed state in embodiment 1.
Figure 4:
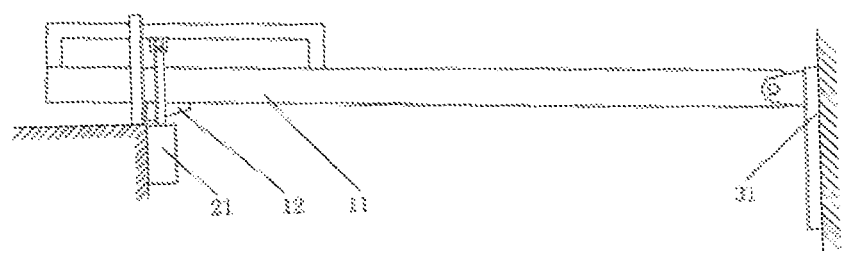
FIG. 4 is a schematic view of the support member in a detached state in embodiment 1.

LIST OF REFERENCE SYMBOLS 1 support member; 11 strut; 12 stopper; 13 slide slot; 2 first mounting base; 21 detachment driving member; 211 connecting rod; 212 positioning member; 213 telescopic driver; 214 slider; 22 limitation frame; 3 second mounting base; 31 mounting plate.

DETAILED DESCRIPTION

In order to facilitate the understanding of the present disclosure, the present disclosure will be described more fully and finely in combination with the accompanying drawings of the description and preferred embodiments, however the scope of protection of the present disclosure is not limited to the following specific embodiments.

Embodiment 1

As shown in FIGS. 1-4, the startup stage protection device for the experiment of the coupler of the EMU train according to this embodiment is provided between two test cars used in the experiment. The startup stage protection device is pressed between the two test cars during the startup stage of the experimental device to undergo the pressing force in place of the coupler. The startup stage protection device is detached from the two test cars after the startup stage is completed. When the experimental device of the EMU train coupler is in the driving state, the startup stage protection device undergoes the pressing force in place of the coupler, so as to prevent a generation of a strong pressing force, which compresses the expansion tube of the coupler, during the startup stage. Therefore, the subsequent collision experiment of the coupler can be carried out completely without hindering the performance measurement of the coupler. The startup stage protection device realizes the connection between the two test cars, thus improving the transmission effect and accelerating the process of the two test cars running at the same speed. Therefore, the experimental device for the coupler of the EMU train enters the experimental state faster, which improves the experimental efficiency. When the experimental device for the coupler of the EMU train reaches the experimental state, the startup stage protection device is detached from the two test cars, so that the coupler enters the experimental state, thus the collision experiment of the coupler can be carried out as usual. This detachable startup stage protection device improves the accuracy and reliability of the collision experiment of the coupler, facilitates the experimental process and saves a lot of time.

In this embodiment, the startup stage protection device includes a support member 1, a first mounting base 2 installed on one car and a second mounting base 3 installed on another car. The first end of the support member 1 is hinged to the second mounting base 3, and the second end of the support 1 is pressed against the car or the first mounting base 2 during the startup stage of the experimental device and detach from the first mounting base 2 after the startup stage is completed. The first mounting base 2 includes a detachment driving member 21, and a drive end of the detachment driving member 21 is configured to push the support member 1 to leave the pressed state. The second mounting base 3 includes a mounting plate 31, and the first end of the support member 1 is hinged to a surface of the mounting plate 31.

In this embodiment, the support member 1 includes a strut 11 and a stopper 12 connected to the strut 11 and arranged below the strut 11. An end of the strut 11 rest on an upper surface of the car, and the stopper 12 is pressured against an end surface of the car.

The detachment driving member 21 further includes a connecting rod 211, a positioning member 212 and a telescopic driver 213. The positioning member 212 is disposed on one side of the strut 11 and the telescopic driver 213 is disposed on another side of the strut 11 opposite to the one side. The first end of the connecting rod 211 is connected to the positioning member 212 and the second end of the connecting rod 211 is connected to the telescopic driver 213. The connecting rod 211 is disposed below the strut 11 or in the strut 11. The connecting rod 211 is slidably connected to the strut 11, and can be pushed by the drive end of the telescopic driver 213 to push upward the strut 11. When the end of the strut 11 is detached from the car, there is not only a vertical relative movement but also a small axial relative movement between the support 1 and the first mounting base 2. The slidably connection between the connecting rod 211 and the strut 11 can ensure that no jamming occurs due to the axial relative movement during the pushing process.

In this embodiment, the first mounting base 2 further includes a limitation frame 22 fixedly connected to the upper surface of the car. The limitation frame 22 is disposed around the end of the strut 11 and restricts a lateral movement of the end of the strut 11.

In this embodiment, threaded holes are provided below the end of the strut 11 and evenly spaced with each other at an interval along the axial direction of the strut 11. The stopper 12 is provided with a plurality of through holes at the same interval as the threaded holes. The stopper 12 is fixed onto the strut 11 by bolts passing through the through holes and fastened to the threaded holes, and the axial relative position between the stopper and the strut 11 can be adjusted. Because the total axial length of the coupler may change due to factors such as model, structure or material of the coupler, it is necessary to adjust the distance between the two test cars in the experimental device accordingly during the experiment. The device, in which the axial relative position between the strut 11 and the stopper 12 can be adjusted, ensures that the pressured position of the stopper 12 is adjustable, so that it can be applied to various experiments of the coupler.

Embodiment 2

Figure 5:
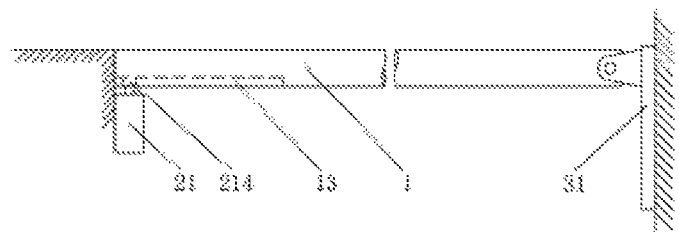
FIG. 5 is a schematic view of the support member in the pressed state in embodiment 2.
Figure 6:
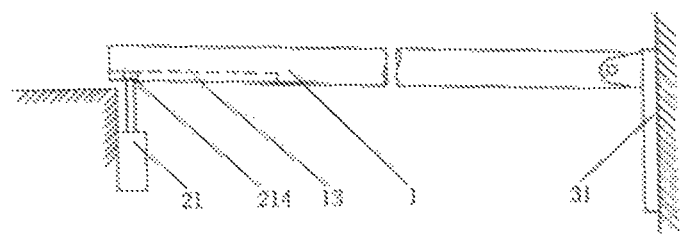
FIG. 6 is a schematic view of the support member in the detached state in embodiment 2.

This embodiment is basically the same as the embodiment 1. The difference between this embodiment and the embodiment 1 is that, in this embodiment, as shown in FIGS. 5 and 6, a slide slot 13 is provided below the second end of the support member 1 along an axial direction of the support member 1. The drive end of the detachment driving member 21 is provided with a slider 214 configured to slide in the slide slot 13, and the drive end of the detachment driving member 21 is slidably engaged with the second end of the support member 1 by a sliding of the slider 214 in the slide slot 13. When the detachable second end of the support member 1 is detached from the car, there is not only a vertical relative movement but also a small axial relative movement between the support 1 and the first mounting base 2. The slidable engagement between the drive end of detachment driving member 21 and the second end of the support member 1 can ensure that no jamming occurs due to the axial relative movement during the pushing process.

The above embodiments only include the case where one end of the support member 1 in the startup stage protection device rest on the car, and the case where one end of the support member 1 in the startup stage protection device rest on the mounting base can also be conceived accordingly.

The above is only the preferred embodiments of the present disclosure, and the scope of the protection of the present disclosure is not limited to the above-mentioned embodiments. For those skilled in the art, modifications and changes obtained without departing from the technical concept of the present disclosure should also be regarded as the scope of protection of the present disclosure.

The invention claimed is:

1. A startup stage protection device for an experiment of a coupler of Electric Multiple Unit (EMU) train, wherein the startup stage protection device is provided between two test cars used in the experiment, and the startup stage protection device is pressed between the two test cars during a startup stage of an experimental device to undergo a pressing force in place of the coupler, and the startup stage protection device is detached from the two test cars after the startup stage is completed,
wherein the startup stage protection device comprises a support member, a first mounting base installed on one car and a second mounting base installed on another car, the first end of the support member is hinged to the second mounting base, and the second end of the support member is pressed against the one car or the first mounting base during the startup stage of the experimental device and detached from the first mounting base after the startup stage is completed,
wherein the support member comprises a strut and a stopper connected to the strut and arranged below the strut, an end of the strut rests on an upper surface of the one car, and the stopper is pressured against an end surface of the one car.

2. The startup stage protection device according to claim 1, wherein the first mounting base comprises a detachment driving member, and a drive end of the detachment driving member is configured to push the support member to leave a pressed state.

3. The startup stage protection device according to claim 2, wherein a slide slot is provided below the second end of the support member along an axial direction of the support member, the drive end of the detachment driving member is provided with a slider configured to slide in the slide slot, and the drive end of the detachment driving member is slidably engaged with the second end of the support member by a sliding of the slider in the slide slot.

4. The startup stage protection device according to claim 2, wherein the second mounting base comprises a mounting plate, and the first end of the support member is hinged to a surface of the mounting plate.

5. The startup stage protection device according to claim 1, wherein the detachment driving member further comprises a connecting rod, a positioning member and a telescopic driver, the positioning member is disposed on one side of the strut and the telescopic driver is disposed on another side of the strut opposite to the one side, the first end of the connecting rod is connected to the positioning member and the second end of the connecting rod is connected to the telescopic driver, the connecting rod is disposed below the strut or in the strut.

6. The startup stage protection device according to claim 5, wherein the first mounting base further comprises a limitation frame fixedly connected to the upper surface of the one car, the limitation frame is disposed around the end of the strut and restricts a lateral movement of the end of the strut.

7. The startup stage protection device according to claim 6, wherein threaded holes are provided below the end of the strut and evenly spaced with each other at an interval along an axial direction of the strut, the stopper is provided with a plurality of through holes at the same interval as the threaded holes, and the stopper is fixed onto the strut by bolts passing through the through holes and fastened to the threaded holes.

8. The startup stage protection device according to claim 5, wherein threaded holes are provided below the end of the strut and evenly spaced with each other at an interval along an axial direction of the strut, the stopper is provided with a plurality of through holes at the same interval as the threaded holes, and the stopper is fixed onto the strut by bolts passing through the through holes and fastened to the threaded holes.

9. The startup stage protection device according to claim 1, wherein threaded holes are provided below the end of the strut and evenly spaced with each other at an interval along an axial direction of the strut, the stopper is provided with a plurality of through holes at the same interval as the threaded holes, and the stopper is fixed onto the strut by bolts passing through the through holes and fastened to the threaded holes.

10. A startup stage protection device for an experiment of a coupler of Electric Multiple Unit (EMU) train, wherein the startup stage protection device is provided between two test cars used in the experiment, and the startup stage protection device is pressed between the two test cars during a startup stage of an experimental device to undergo a pressing force in place of the coupler, and the startup stage protection device is detached from the two test cars after the startup stage is completed, wherein the startup stage protection device comprises a support member, a first mounting base installed on one car and a second mounting base installed on another car, the first end of the support member is hinged to the second mounting base, and the second end of the support member is pressed against the one car or the first mounting base during the startup stage of the experimental device and detached from the first mounting base after the startup stage is completed, wherein the first mounting base comprises a detachment driving member, and a drive end of the detachment driving member is configured to push the support member to leave a pressed state, wherein a slide slot is provided below the second end of the support member along an axial direction of the support member, the drive end of the detachment driving member is provided with a slider configured to slide in the slide slot, and the drive end of the detachment driving member is slidably engaged with the second end of the support member by a sliding of the slider in the slide slot.

* * * * *